US008695843B1

(12) United States Patent  (10) Patent No.: US 8,695,843 B1
Brinas  (45) Date of Patent: Apr. 15, 2014

(54) ADAPTABLE BIN WITH RETRACTABLE CUP HOLDER

(71) Applicant: GM Global Technology Operations LLC, Detroit, MI (US)

(72) Inventor: Gerard Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/654,472

(22) Filed: Oct. 18, 2012

(51) Int. Cl.
*B60N 3/10* (2006.01)

(52) U.S. Cl.
USPC ........................ 220/737; 224/926; 248/311.2

(58) Field of Classification Search
USPC .......... 220/737, 738; 224/281, 282, 926, 485; 296/37.1, 37.14, 37.8; 248/311.2
See application file for complete search history.

(56) References Cited

U.S. PATENT DOCUMENTS

| 5,598,999 | A | * | 2/1997 | Plocher et al. | 248/311.2 |
| 5,634,621 | A | * | 6/1997 | Jankovic | 248/311.2 |
| 6,732,894 | B2 | * | 5/2004 | Hubbert et al. | 224/539 |
| 6,758,452 | B1 | * | 7/2004 | Salenbauch et al. | 248/311.2 |
| 6,843,397 | B2 | * | 1/2005 | Then et al. | 224/552 |
| 7,290,678 | B2 | * | 11/2007 | Park | 220/737 |

FOREIGN PATENT DOCUMENTS

JP  2004074904 A  *  3/2004

* cited by examiner

*Primary Examiner* — Anthony Stashick
*Assistant Examiner* — Robert Stodola
(74) *Attorney, Agent, or Firm* — Quinn Law Group, PLLC

(57) ABSTRACT

An adaptable bin having a retractable cup holder includes a bin wall and a bin floor. The bin wall and the bin floor define a storage volume, which substantially encapsulates the retractable cup holder. A plurality of spiral links are movable between a stowed position and a deployed position. At least one of the plurality of spiral links is operatively attached to one of the bin wall and the bin floor. A cup holder axis is defined by the plurality of spiral links, each of which rotates about the cup holder axis between the stowed position and deployed position. The plurality of spiral links define the retractable cup holder in the deployed position.

19 Claims, 5 Drawing Sheets

ADAPTABLE BIN WITH RETRACTABLE CUP HOLDER

TECHNICAL FIELD

This disclosure relates to storage bins and cup holders, particularly those used in vehicles.

BACKGROUND

Storage bins may be used to hold various items in the vehicle, including electronics, vehicle accessories, or personal items. Some vehicles may include one or more cup holders designed to support and grasp liquid containers used by occupants within the vehicle.

SUMMARY

An adaptable bin having a retractable cup holder is provided. The adaptable bin includes a bin wall and a bin floor. The bin wall and the bin floor define a storage volume, which substantially encapsulates the retractable cup holder.

A plurality of spiral links are movable between a stowed position and a deployed position. At least one of the plurality of spiral links is operatively attached to one of the bin wall and the bin floor. A cup holder axis is defined by the plurality of spiral links, and each of the plurality of spiral links rotates about the cup holder axis between the stowed position and deployed position. The plurality of spiral links define the retractable cup holder when in their deployed positions.

The above features and advantages, and other features and advantages of the present invention are readily apparent from the following detailed description of some of the best modes and other embodiments for carrying out the invention, which is defined solely by the appended claims, when taken in connection with the accompanying drawings.

DETAILED DESCRIPTION

Figure 1:
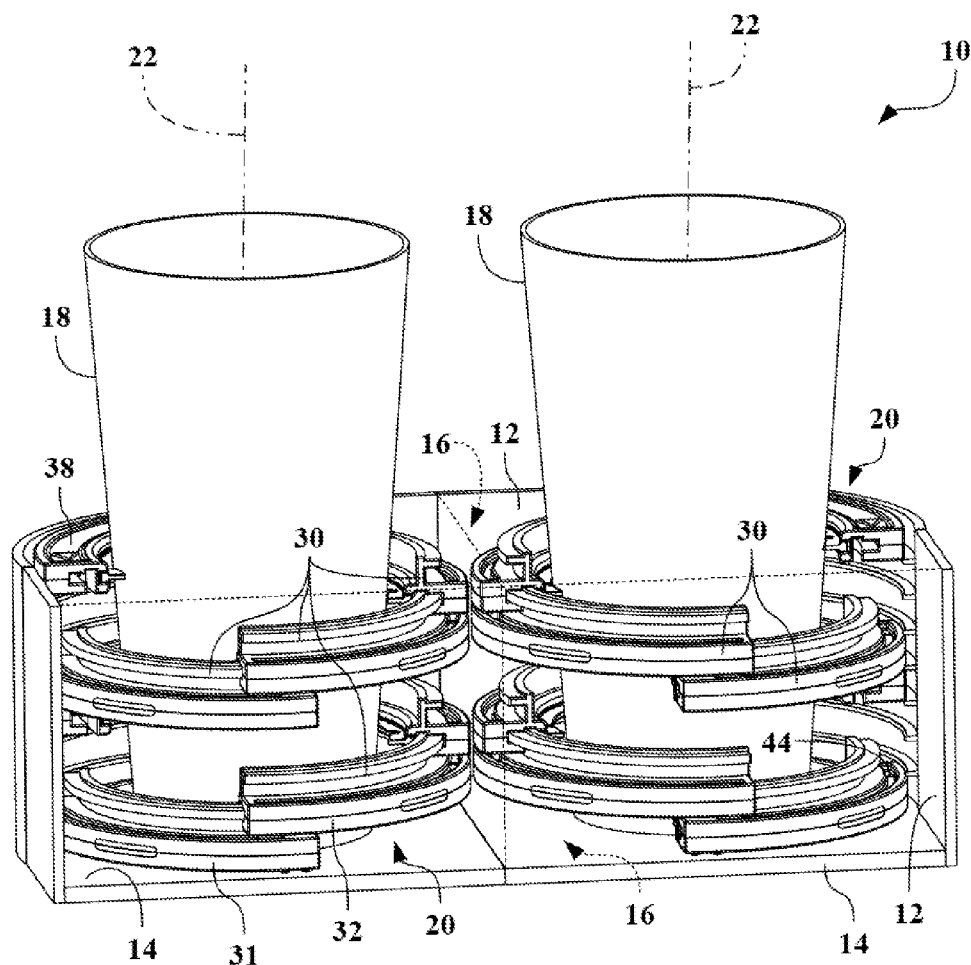
FIG. 1 is a schematic isometric view of an adaptable bin holding two cups in two retractable cup holders.

Referring to the drawings, like reference numbers correspond to like or similar components wherever possible throughout the several figures. FIG. 1 shows an adaptable bin 10 for a vehicle (not shown). The adaptable bin 10 may be located in the passenger compartment or elsewhere within the vehicle.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description. All elements may be mixed and matched between figures.

The adaptable bin 10 includes a bin wall 12 and a bin floor 14, which cooperate to define a storage volume 16. In the configuration shown, the bin wall 12 and the bin floor 14 are approximately perpendicular to one another. However, the bin wall 12 and the bin floor 14 need not be perpendicular and in many cases the bin wall 12 will have an obtuse angle relative to the bin floor 14.

Depending upon the configuration of the adaptable bin 10, there may be a portion of the bin wall 12 removed from view in FIG. 1 or the adaptable bin 10 may butt against adjacent components, which may act as portions of the bin wall 12. Alternatively, the portion of the adaptable bin 10 shown may be only a portion of a larger adaptable bin 10 with the bin wall 12 and the bin floor 14 extending further out of the view plane or mirroring what is shown in the figures. The bin wall 12 and the bin floor 14 are shown intersecting at substantially right angles. However, many production versions of the adaptable bin 10 will include fillets, bosses, or protrusions into the storage volume 16 at the intersection of the bin wall 12 and the bin floor 14.

The bin wall 12 and the bin floor 14 define the storage volume 16. The storage volume 16 is illustratively shown by dashed lines approximating the edges of the storage volume 16 defined by the portions of the bin floor 14 and the bin wall 12 shown. Therefore, based upon the configuration of the bin wall 12 and the bin floor 14, the storage volume 16 may vary in size and shape from that illustrated in the figures. Importantly, the storage volume 16 may be partially defined by adjacent components, some of which may function as, or form, portions of the bin wall 12.

In FIG. 1, the adaptable bin 10 is holding two liquid containers or cups 18 that are partially within the storage volume 16. Each cup 18 is disposed within a retractable cup holder 20 (which may be referred to herein simply as a cup holder 20).

While two cup holders 20 are shown in FIG. 1, additional or fewer cups 18 may be placed or stored within the storage volume 16, depending upon the configuration and the number of cup holders 20 incorporated therein. The storage volume 16 substantially encapsulates both of the cup holders 20, such that the retractable cup holders 20 selectively block or occupy a portion of the storage volume 16.

A cup holder axis 22 (which may be referred to herein simply as the axis 22) is substantially central to the cup holders 20, which are generally formed by a plurality of rotating links or spiral links 30. The cup holders 20 may be moved between retracted positions and deployed positions (as shown in FIG. 1). In some embodiments of the adaptable bin 10, some of the spiral links 30 may be positioned slightly above the bin wall 12, such that a small portion of the cup holders 20 may be above the storage volume 16.

In the adaptable bin 10 shown, each of the cup holders 20 is substantially symmetric about the holder axis 22. However, one or more of the cup holders 20 may be asymmetric. For example, the upper portion of the cup holder 20 may extend further from the bin wall 12 to allow for larger containers or for cups 18 having handles.

Figure 2:
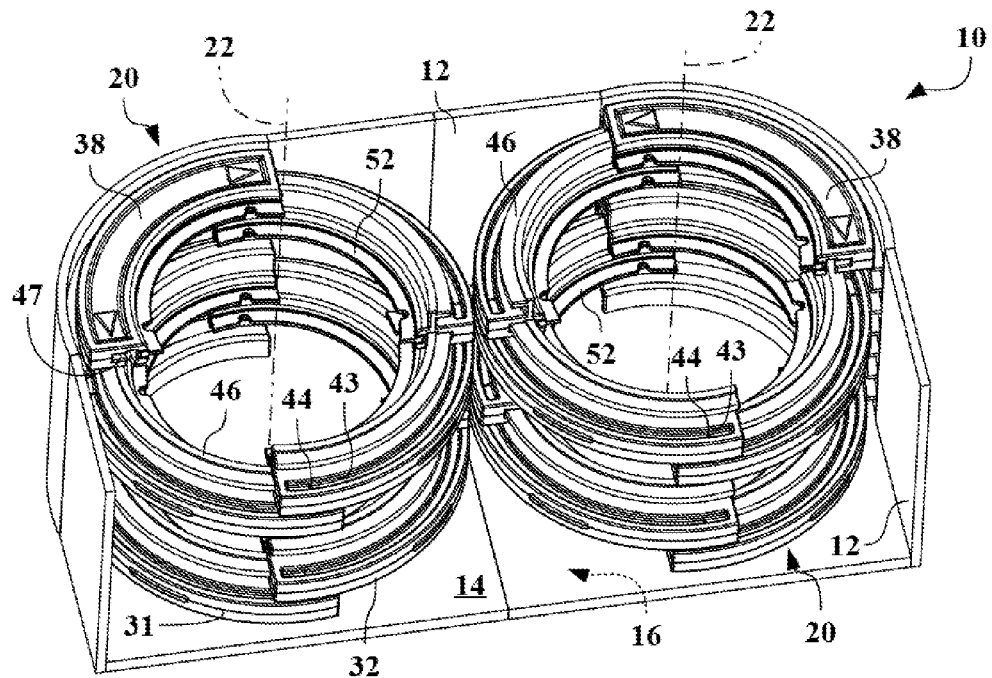
FIG. 2 is a schematic isometric view of the adaptable bin of FIG. 1, shown with the two cups removed to illustrate a plurality of spiral links that form the retractable cup holders.
Figure 3:
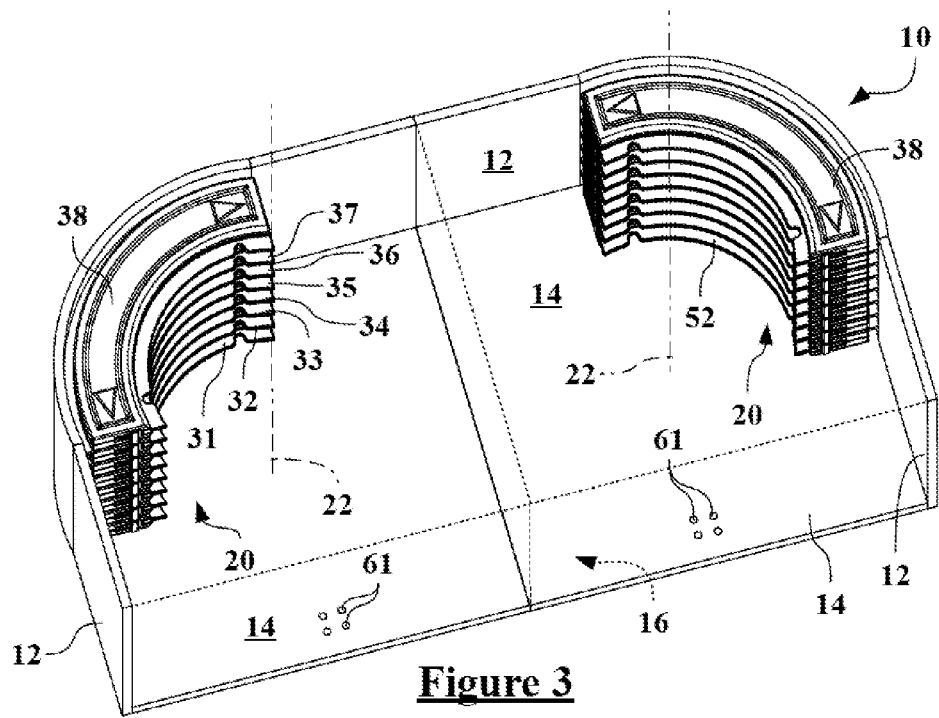
FIG. 3 is a schematic isometric view of the adaptable bin shown in FIG. 2, with the spiral links moved into stowed positions to substantially free a storage volume.
Figure 4:
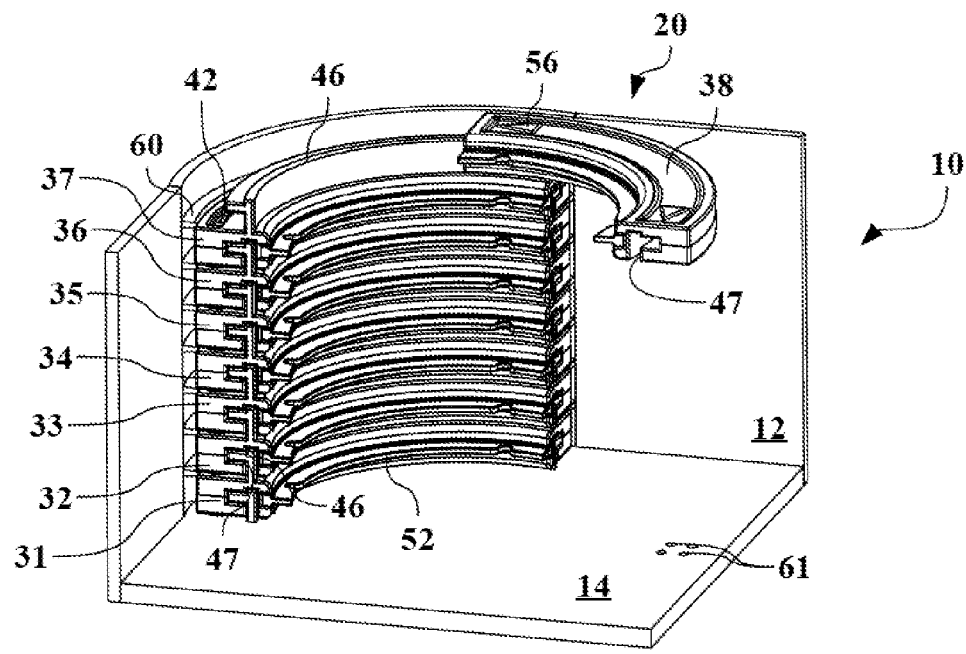
FIG. 4 is a schematic isometric view of a portion of the adaptable bin shown in FIGS. 1-3 and is shown with a top spiral link in a deployed position.

Referring also to FIG. 2, FIG. 3, and FIG. 4, and with continued reference to FIG. 1, there are shown additional views of the adaptable bin 10. FIG. 2 shows the adaptable bin 10 without the cups 18, and better illustrates the cup holders 20 in an extended or deployed position. FIG. 3 shows the adaptable bin 10 with the cup holders 20 in a retracted or stowed position. FIG. 4 shows a portion of the adaptable bin 10 with the cup holder 20 between the extended and the retracted positions.

Each of the spiral links 30 rotates about the axis 22 between a deployed position, shown in FIGS. 1 and 2, and a stowed position, shown in FIG. 3. The axis 22 and the cup holder 20 may be viewed as defined by the spiral links 30 when in the deployed position. The spiral links 30 are generally curved or have an arc shape. However, other shapes may effect the functions of the spiral links 30 to form the cup holder 20, which are described herein.

When the spiral links 30 are in the stowed position, the cup holder 20 retracts substantially out of the storage volume 16. Therefore, the storage volume 16 is substantially open and unimpeded by any structure for holding the cups 18, such that the full storage volume 16 is available for other uses.

As illustrated in the figures, the spiral links 30 are curved substantially-radially about the axis 22. The stowed position, relative to the bin wall 12, is the same for all of the spiral links 30, each of which is proximate to its neighboring (vertically-adjacent) spiral links 30. In the deployed position, each spiral link 30 is distally-extended—or cantilevered—relative to the neighboring spiral links 30, although portions of the spiral links 30 always remain touching in the deployed position, as shown in FIGS. 1-2. All of the spiral links 30 define the axis 22 in both the stowed position and the deployed position.

Each of the spiral links 30 may be very similar, but some of the spiral links 30 may have different features. As used herein, spiral links 30 refers generally and collectively to all of the links forming the cup holders 20. However, individual links may be separately identified based upon location, function, or both. The different spiral links 30 used in the specific cup holder 20 shown in the figures will be described herein with reference the position or function of spiral links 30 forming the cup holder 20.

As shown in FIG. 2, the cup holder 20 on the right (as viewed in the figure) may be deployed by rotating the spiral links 30 clockwise. However, the cup holder 20 on the left (as viewed in the figure) may be deployed by rotating the spiral links 30 counterclockwise. Alternatively, both cup holders 20 may rotate in the same direction, such that the components may be substantially identical, as opposed to mirrored, between the cup holders 20.

A first link 31 is operatively attached to one of the bin wall 12 and the bin floor 14. The first link 31 may be referred to as a bottom link. The first link 31 is movable between a stowed position adjacent to the bin wall 12, as shown in FIG. 3, and a deployed position away from the bin wall 12, as shown in FIGS. 1-2.

A second link 32 is operatively attached to the first link 31. In the exemplary cup holder 20 shown in the figures, the second link 32 is attached to the top of the first link 31. The second link 32 may be referred to as an intermediate link. Numerical designation as first, second, or otherwise, of any components are not limiting, and components or elements may be numbered randomly or consecutively from any beginning position.

The second link 32 is movable between a stowed position, as shown in FIG. 3, and a deployed position as shown in FIGS. 1-2. The deployed position changes the location of the second link 32 relative to both the bin wall 12 and to the first link 31.

The first link 31 and the second link 32 both rotate about the axis 22 between the respective stowed positions and deployed positions. As shown in FIGS. 1 and 2, in the deployed position the first link 31 is rotated approximately ninety degrees about the axis 22 from its stowed position, and the second link 32 is rotated approximately one-hundred and eighty degrees.

The additional spiral links 30 in the cup holder 20 shown in the figures may be referred to as a third link 33, a fourth link 34, a fifth link 35, a sixth link 36, a seventh link 37, and an eighth link 38. The first link 31 may be referred to as a bottom link, the second link 32 through the seventh link 37 may be referred to as intermediate links, and the eighth link 38 may be referred to as a top link. In the embodiment shown in the figures, the first link 31 through the seventh link 37 are substantially identical, but the eighth link 38 is slightly different.

Figure 5A:
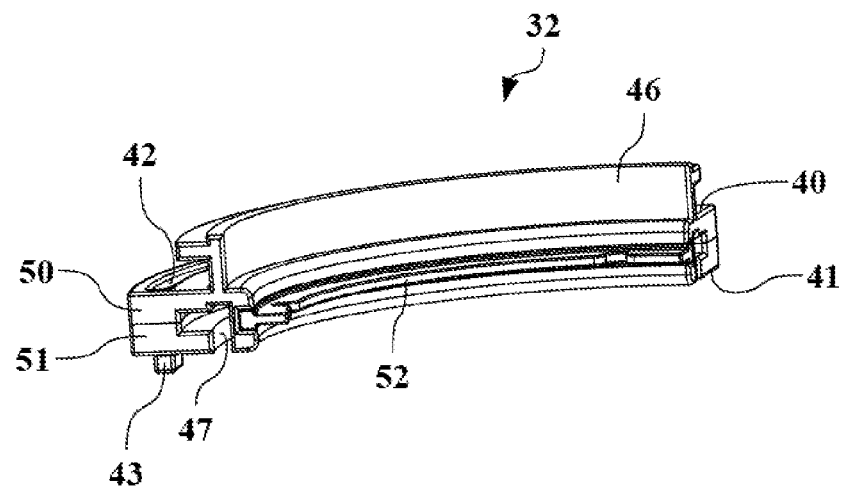
FIG. 5A is a schematic isometric view of an intermediate spiral link, which may form portions of the retractable cup holders shown in FIGS. 1-4.
Figure 5B:
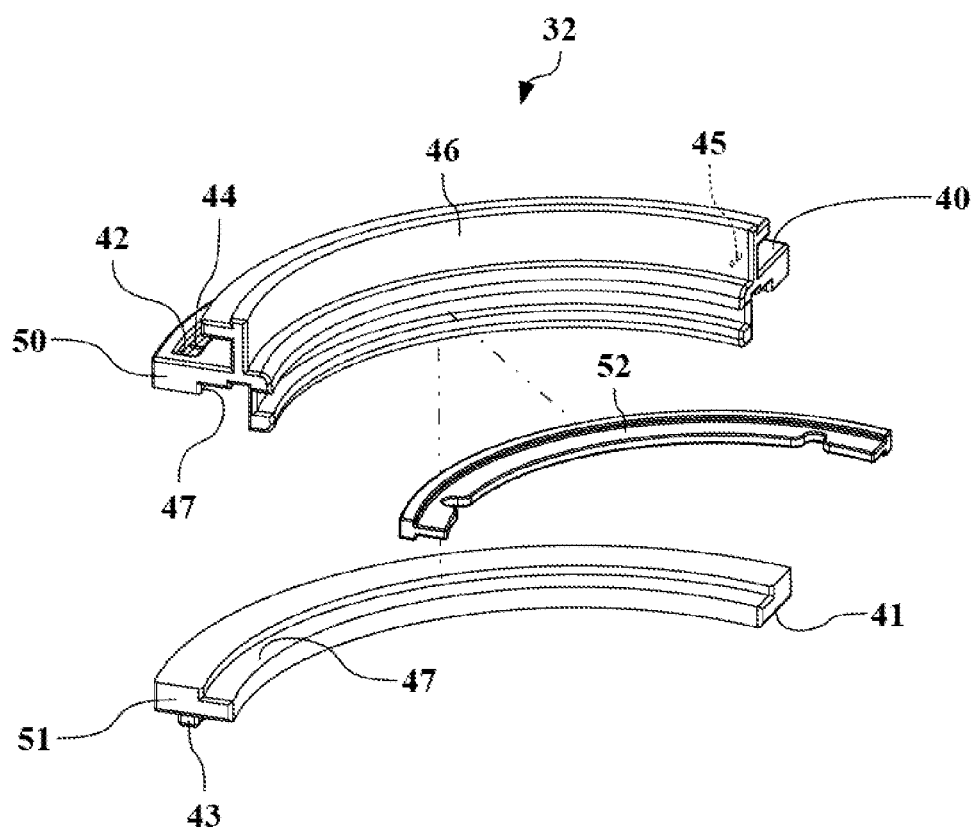
FIG. 5B is a schematic exploded view of the intermediate spiral link shown in FIG. 5A, and illustrates one embodiment for constructing the intermediate spiral link.

Referring now to FIGS. 5A and 5B, and with continued reference to FIGS. 1-4, there are shown additional views of the second link 32. Features of the second link 32, and any of the other intermediate links, may be more apparent with reference to FIG. 5A, which shows an isometric view of the second link 32, and FIG. 5B, which shows an exploded view of the second link 32.

In the embodiment of the adaptable bin 10 and the cup holders 20 shown in the figures, the first link 31 is also substantially identical to the second link 32. Therefore, the description of the second link 32, and all of the features shown in FIGS. 5A and 5B, applies equally to the first link 31. While only the interactions between the first link 31 and the second link 32 are described in detail, the description applies equally to each of the third through seventh links 33-37. As will be described further herein, the eighth link 38 and the seventh link 37 also interact and move relative to each other similarly to the second link 32 and the first link 31.

To assist in supporting the second link 32 relative to the first link 31, or other adjacent links, the first link 31 and the second link 32 include an upper mating feature on an upper side 40 thereof. Furthermore, the first link 31 and the second link 32 include a lower mating feature on a lower side 41 thereof.

The lower mating feature of the second link 32 is configured to cooperate with the upper mating feature of the first link 31. Therefore, the second link 32 moves between the stowed position and the deployed position by sliding either the lower mating feature or the upper mating feature relative to the other.

In this configuration of the first link 31 and the second link 32, the upper mating feature is a pin slot 42 and the lower mating feature is a pin 43. Note however, that these features could be reversed, such that the pin 43 is on the upper side 40 and the pin slot 42 is on the lower side 41.

In the embodiment shown, the pin 43 slides relative to the pin slot 42 of the first link 31. Furthermore, the pin slot 42 substantially encases the pin 43.

In an alternative embodiment, the first link 31 may not be substantially identical to the second link 32. For example, the lower side 41 of the first link 31 may be substantially flat to facilitate simply sliding along the bin floor 14, instead of interacting with features of the bin floor 14.

A first detent 44 is formed in the pin slot 42 and extends toward the pin 43. The first detent 44 is disposed in the pin slot 42 adjacent to the location of the pin 43 in the stowed position and restricts movement of the pin 43, and the link to which it is attached, away from the deployed position. Therefore, the first detent 44 impedes movement of the pin 43 through the pin slot 42 as the second link 32 moves between the deployed and stowed positions relative to the first link 31. In the embodiment shown, the first detent 44 restricts movement from the stowed position to the deployed position, and assists in keeping the cup holder 20 retracted.

A second detent 45 may be formed in the pin slot 42. The second detent 45 is shown in phantom FIG. 5B and is largely hidden from view in the other figures, but may be substantially identical to the first detent 44. The second detent 45 extends toward the pin 43 and impedes movement of the pin 43 through the pin slot 42. The second detent 45 restrains the second link 32 from moving from the deployed position to the stowed position, and assists in keeping the cup holder 20 extended.

As can be understood from the foregoing, the third link 33 is substantially identical to the second link 32 and operatively attaches to the upper mating feature (the pin slot 43) of the second link 32. The third link 33 is similarly movable between a stowed position and a deployed position relative to the bin wall 12 and to the second link 32.

The fourth link 34 is also substantially identical to the second link 32 and operatively attached to the top of the third link 33, and is movable between a stowed position and a deployed position relative to the third link 33. As best illustrated in FIGS. 2 and 3, the fourth link 34 makes one complete rotation about the axis 22 when deployed. Therefore, relative to the bin wall 12, the deployed position of the fourth link 34 is the same as the stowed position. However, relative to the third link 33, the deployed position of the fourth link 34 is different than the stowed position.

To assist in supporting the second link 32 relative to the first link 31, or other adjacent links, the first link 31 and the second link 32 include additional mating features. The first link 31 further includes a track 46 on the upper side 40, and the second link 32 further includes a track slot 47 or track receptacle on the lower side 41.

The track slot 47 is configured to slidably receive the track 46 of the first link 31, such that the second link 32 moves between the stowed position and the deployed position by sliding along the track 46 of the first link 31. In the stowed position, the track 46 of the first link 31 substantially fills the track slot 47 of the second link 32, but only a portion of the track 46 is retained within the track slot 47 in the deployed position.

The track 46 and the track slot 47 add support as the second link 32 cantilevers relative to the first link 31 in the deployed position. In this embodiment, these features are used together with the pin slot 42 and the pin 43. However, in other embodiments, the track 46 and the track slot 47 may be the only supportive or restrictive features of the first link 31 and the second link 32.

In the embodiment shown in the figures, the pins 43 are single-spot columns, which cooperate with the first detent 44 and the second detent 45 to restrain movement when the spiral links 30 are in either the stowed or the deployed positions. The tracks 46 run along substantially the entire length of the spiral links 30 and provide cantilever support and guidance when spiral links 30 rotate to the deployed position. The pin slot 42, the pins 43, the tracks 46, and the track slots 47 may all be considered mating features. The track slots 47 are open at the ends of the spiral links 30, but the pin slots 42 are closed, such that movement of the adjacent spiral links 30 are limited by the pin slots 42.

The intermediate links may be formed in multiple pieces, as shown in the exploded view of the second link 32 in FIG. 5B. There may be manufacturability gains from the multipiece design of the embodiment shown.

The second link 32 is formed from an upper piece 50, which includes the upper surface 40, and a lower piece 51, which includes the lower surface 41. As shown, the second link 32 may also include a bumper 52, which may be formed from rubber or comparable materials. The bumper 52 is more flexible than the upper piece 50 or the lower piece 51, and may provide improved contact between the cups 18 and the cup holders 20.

The pin 43 extends downward from the lower piece 51. The pin slot 42 is formed in, and defined by, the upper piece 50, which also forms the track 46. Both the upper piece 50 and the lower piece 51 define the track slot 47.

Figure 6A:
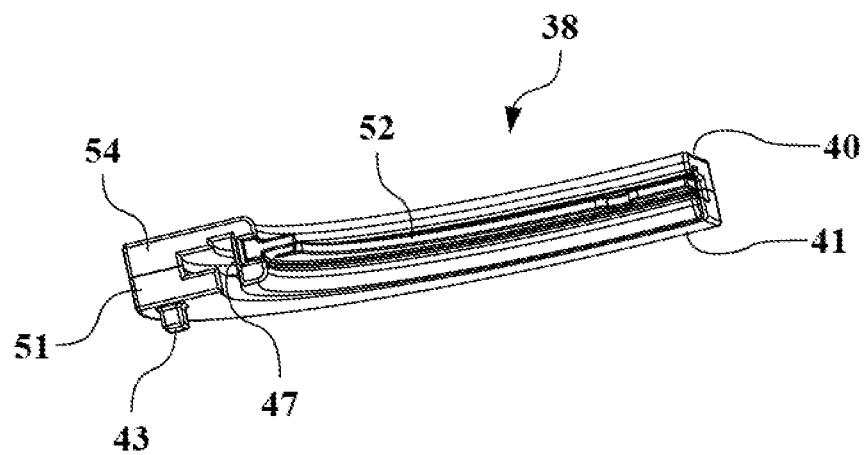
FIG. 6A is a schematic isometric view of the top spiral link, which may form portions of the retractable cup holders shown in FIGS. 1-4.
Figure 6B:
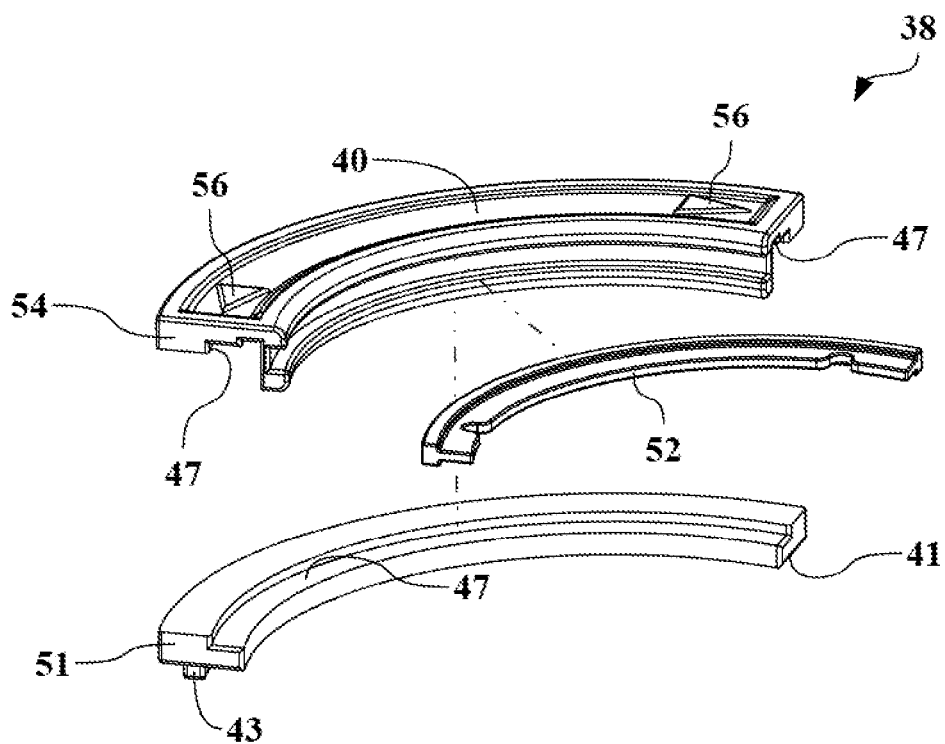
FIG. 6B is a schematic exploded view of the top spiral link shown in FIG. 6A, and illustrates one embodiment for constructing the top spiral link.

Referring now to FIGS. 6A and 6B, and with continued reference to FIGS. 1-5B, there are shown two views of the eighth link. FIG. 6A shows an isometric view the eighth link 38, and FIG. 6B shows an exploded view of the eighth link 38. The first link 31 through the seventh link 37 are substantially identical in the embodiment shown in the figures. However, the eighth link 38 does not include all of the features of the other spiral links 30.

The eighth link 38 does not include the pin slot 42 and does not include the track 46 on the upper side 40. Because there are no additional spiral links 30 above the eight link 38, it does not include any of the upper mating features. Instead, a flat upper piece 54 replaces the upper piece 50 of the seventh link 37.

The lower piece 51 may be identical for the eighth link 38 and the remaining spiral links 30, such that the eighth link 38 includes the pin 43 and the track slot 47. The eighth link 38 also includes a bumper 52.

The eighth link 38 may include indicators to direct vehicle occupants on operation of the cup holders 20. Additionally, the eighth link 38 may include finger grips 56, tabs, or pulls to assist in gripping the eighth link 38 and moving the cup holders 20 between the extended and retracted positions.

Figure 7:
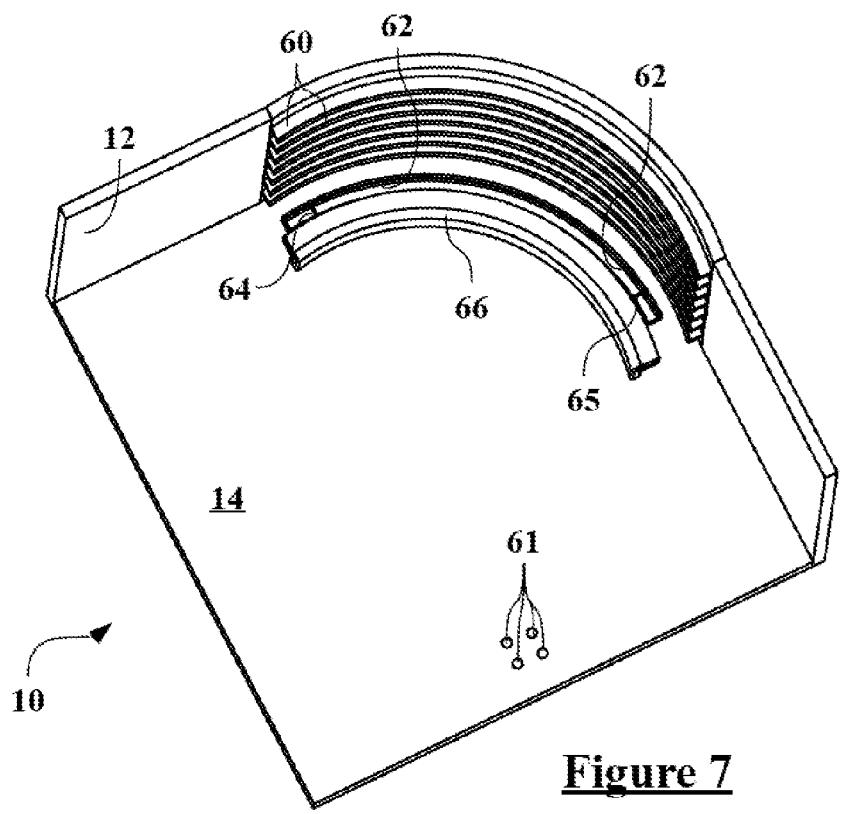
FIG. 7 is a schematic isometric view of a portion of the adaptable bin, illustrated without the retractable cup holder.

Referring now to FIG. 7, and with continued reference to FIGS. 1-6B, there is shown an isometric view of a portion of the adaptable bin 10 with the cup holder 20 hidden from view. As shown in FIG. 7, the bin wall 12 and the bin floor 14 may include features to assist in moving the spiral links 30 between the stowed and the deployed positions.

A plurality of guide rails 60 are formed on the bin wall 12. These guide rails 60 provide support for all of the spiral links 30 in the stowed positions and provide direct support for the fourth link 34 and the eighth link 38 in the deployed position.

A support boss 61 is formed in the bin floor 14. The support boss 61 provides support for the first link 31 in the deployed position by preventing the first link 31 from being completely cantilevered. Furthermore, the support boss 61 may act as a detent feature to keep the first link 31 in the deployed position. The support boss 61 may be a cluster or plurality of small features, such as nubs, detents, or indentions.

Several of the features of the adaptable bin 10 match those of the upper surface 40 of the first link 31. A floor pin slot 62 cooperates with the pin 43 of the first link. The floor pin slot 62 also includes a first floor detent 64 and a second floor detent 65, both of which may function similarly to the first detent 44 and the second detent 45 on the upper side 40 of the intermediate links. A floor track 66 similarly cooperates with the track slot 47 of the first link 31. Note that the second floor detent 65 shown in FIG. 7 also illustrates the second detent 45 of the second link 32, which is hidden from view in the figures.

In operation, the cup holders 20 of the adaptable bin 10 may be taken from the refracted position, as shown in FIG. 3, to the extended position, as shown in FIGS. 1-2, by moving at least some of the spiral links 30 from their respective stowed positions to their respective deployed positions. FIG. 4 represents the cup holder 20 just as the operator is beginning to pull the eighth link 38 toward the deployed position and extending the cup holder 20.

In their deployed positions, the first link 31, the second link 32, the third link 33, and the fourth link 34 are offset by substantially ninety degrees about the axis 22 in the deployed position. Similarly, the fifth link 35, the sixth link 36, the seventh link 37, and the eighth link 38 are offset by substantially ninety degrees about the axis 22 in the deployed position.

When moving from the stowed to the deployed position, the fourth link 34 rotates fully once and returns to the same position relative to the bin wall 12. When moving from the stowed to the deployed position, the eighth link 38 rotates about the axis 22 twice and then returns to the same position relative to the bin wall 12. Therefore, to fully expand the retractable cup holders 20, the operator pulls or rotates the eighth link 38 to make two rotations about the axis 22, and each of the lower spiral links 30 are pulled around behind the eight link 38 until each of the spiral links 30 reaches its respective deployed position.

In an alternative embodiment, which is not shown, the fourth link 34 and the eighth link 38 may be connected by a vertical member. In such an embodiment, pulling the eighth link 38 open, as shown in FIG. 4, would also pull the fourth link 34. Therefore, the operator would only pull the eighth link 38 one rotation about the axis. The eighth link 38 would consecutively pull the seventh link 37, the sixth link 36, and the fifth link 35, but the fourth link 34—through its vertical connection to the eighth link 38—would pull the third link 33, the second link 32, and the first link 31.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. An adaptable bin having a first cup holder, comprising:
   a storage volume defined by a bin wall and a bin floor, wherein the storage volume encapsulates the first cup holder;
   a first link operatively attached to one of the bin wall and the bin floor, wherein the first link is movable between a stowed position adjacent to the bin wall and a deployed position away from the bin wall;
   a second link operatively attached to the first link, wherein the second link is movable between a stowed position and a deployed position relative to the bin wall and to the first link; and
   a cup holder axis defined by the first link and the second link, wherein the cup holder axis does not intersect the first link and the second link, and the first link rotates about the cup holder axis between the stowed position and deployed position and the second link rotates about the cup holder axis between the stowed position and deployed position.

2. The adaptable bin of claim 1,
   wherein the first link includes an upper mating feature on an upper side thereof,
   wherein the second link includes a lower mating feature on a lower side thereof, and
   wherein the lower mating feature of the second link is configured to cooperate with the upper mating feature of the first link, such that the second link moves between the stowed position and the deployed position by one of the lower mating feature and the upper mating feature sliding relative to the other.

3. The adaptable bin of claim 2, wherein the second link includes an upper mating feature on an upper side thereof, and further comprising:
   a third link substantially identical to the second link and operatively attached to the upper mating feature of the second link, wherein the third link is movable between a stowed position and a deployed position relative to the bin wall and to the second link; and
   a fourth link substantially identical to the second link and operatively attached to the top of the third link, wherein the fourth link is movable between a stowed position and a deployed position relative to the third link.

4. The adaptable bin of claim 3, wherein the first link, the second link, the third link, and the fourth link are offset by substantially ninety degrees about the cup holder axis in the deployed position.

5. The adaptable bin of claim 4,
   wherein the upper mating feature is a pin slot, and
   wherein the lower mating feature is a pin.

6. The adaptable bin of claim 5,
   wherein the first link further includes a track on the upper side, and
   wherein the second link further includes a track receptacle on the lower side, wherein the track receptacle is configured to slidably receive the track of the first link, such that the second link moves between the stowed position and the deployed position by sliding along the track of the first link.

7. The adaptable bin of claim 6, further comprising:
   a first detent formed in the pin slot and extending toward the pin, such that the first detent impedes movement of the pin through the pin slot; and
   a second detent formed in the pin slot and extending toward the pin, such that the second detent impedes movement of the pin through the pin slot.

8. The adaptable bin of claim 7, further comprising:
   a first guide rail formed on the bin wall.

9. The adaptable bin of claim 8, further comprising:
   a fifth link substantially identical to the second link and operatively attached to the upper mating feature of the fourth link, wherein the fifth link is movable between a stowed position and a deployed position relative to the bin wall and to the fourth link;
   a sixth link substantially identical to the second link and operatively attached to the top of the fifth link, wherein the sixth link is movable between a stowed position and a deployed position relative to the fifth link;
   a seventh link substantially identical to the second link and operatively attached to the upper mating feature of the sixth link, wherein the seventh link is movable between a stowed position and a deployed position relative to the bin wall and to the sixth link; and
   an eighth link operatively attached to the top of the seventh link, wherein the eighth link is movable between a stowed position and a deployed position relative to the seventh link, but does not include the track and does not include the pin slot.

10. The adaptable bin of claim 9, wherein the first through eighth links have an arc shape, such that they are curved about the cup holder axis.

11. The adaptable bin of claim 10, wherein the adaptable bin has a second cup holder, which is substantially identical to the first cup holder and wherein the storage volume encapsulates the second cup holder.

12. An adaptable bin having a retractable cup holder, comprising:
   a bin wall;
   a bin floor;
   a storage volume defined by the bin wall and the bin floor, wherein the storage volume substantially encapsulates the retractable cup holder;
   a plurality of spiral links, wherein at least one of the plurality of spiral links is operatively attached to one of the bin wall and the bin floor, and each of the plurality of spiral links is movable between a stowed position and a deployed position; and
   a cup holder axis defined by the plurality of spiral links, wherein each of the plurality of spiral links rotates about the cup holder axis between the stowed position and deployed position to define the retractable cup holder, and the cup holder axis does not intersect any of the plurality of spiral links.

13. The adaptable bin of claim 12, wherein the plurality of spiral links have an arc shape, such that they are curved about the cup holder axis.

14. The adaptable bin of claim 13, wherein:
   in the stowed position, each of the plurality of spiral links is proximal to at least one neighboring spiral link; and
   in the deployed position, each of the plurality of spiral links is substantially distal to at least one neighboring spiral link.

15. The adaptable bin of claim 14,
   wherein a lower side of each of the plurality of spiral links includes a pin, and
   wherein an upper side of at least two of the plurality of spiral links includes a pin slot configured to slidably receive the pin of a respective adjacent spiral link.

16. The adaptable bin of claim 15,
   wherein the lower side of each of the plurality of spiral links includes a track slot, and
   wherein the upper side of at least two of the plurality of spiral links includes a track configured to be slidably received within the track slot of a respective adjacent spiral link.

17. An adaptable bin having a first cup holder movable between a retracted position and a deployed position, the adaptable bin comprising:
   a storage volume defined by a bin wall and a bin floor, wherein the storage volume encapsulates the first cup holder;
   a cup holder axis, wherein the first cup holder is defined around the cup holder axis and substantially surrounds the cup holder axis in the deployed position;
   a first link operatively attached to one of the bin wall and the bin floor, such that the first link is rotatable about the cup holder axis between a stowed position adjacent to the bin wall and a deployed position away from the bin wall;
   a second link operatively attached to the first link, such that the second link is rotatable about the cup holder axis between a stowed position and a deployed position relative to the bin wall and to the first link; and
   wherein the cup holder axis does not intersect the first link and the second link.

18. The adaptable bin of claim 17,
   wherein the first link includes an upper mating feature on an upper side thereof,
   wherein the second link includes a lower mating feature on a lower side thereof, and
   wherein the lower mating feature of the second link is configured to cooperate with the upper mating feature of the first link, such that the second link moves between the stowed position and the deployed position by one of the lower mating feature and the upper mating feature sliding relative to the other.

19. The adaptable bin of claim 18, wherein the first link and the second link have an arc shape, such that they are curved about the cup holder axis.

* * * * *